United States Patent
Lu

(10) Patent No.: US 7,006,458 B1
(45) Date of Patent: Feb. 28, 2006

(54) ECHO CANCELLER DISABLER FOR MODULATED DATA SIGNALS

(75) Inventor: Youhong Lu, Vernon Hills, IL (US)

(73) Assignee: 3Com Corporation, Marlborough, MA (US)

( * ) Notice: Subject to any disclaimer, the term of this patent is extended or adjusted under 35 U.S.C. 154(b) by 919 days.

(21) Appl. No.: 09/639,551

(22) Filed: Aug. 16, 2000

(51) Int. Cl.
*H04B 3/20* (2006.01)

(52) U.S. Cl. ............... 370/290; 375/350; 379/406.08

(58) Field of Classification Search ........ 370/286–292, 370/201, 463, 419; 375/219, 222, 231, 232, 375/326, 106, 346, 350; 379/406.01–406.16, 379/410, 407; 455/296
See application file for complete search history.

(56) References Cited

U.S. PATENT DOCUMENTS

| | | | | |
|---|---|---|---|---|
| 4,571,720 A | | 2/1986 | Chevreau et al. ............. 370/32 |
| 4,970,715 A | * | 11/1990 | McMahan ................... 370/287 |
| 5,295,136 A | | 3/1994 | Ashley et al. ............. 370/32.1 |
| 5,592,548 A | | 1/1997 | Sih ............................. 379/410 |
| 5,598,468 A | | 1/1997 | Ammicht et al. ........... 379/410 |
| 5,638,439 A | | 6/1997 | Kawada et al. ............. 379/411 |
| 5,828,657 A | * | 10/1998 | Betts et al. ................. 370/289 |
| 5,864,545 A | | 1/1999 | Gonikberg et al. ......... 370/286 |
| 6,049,606 A | | 4/2000 | Ding et al. ................. 379/406 |
| 6,049,607 A | * | 4/2000 | Marash et al. ......... 379/406.08 |
| 6,055,310 A | * | 4/2000 | Zhang et al. .......... 379/406.08 |
| 6,347,141 B1 | * | 2/2002 | Klein et al. ............ 379/406.08 |
| 6,434,110 B1 | * | 8/2002 | Hemkumar ................. 370/201 |
| 6,560,332 B1 | * | 5/2003 | Christensson et al. . 379/406.05 |
| 6,563,803 B1 | * | 5/2003 | Lee ............................. 370/290 |
| 2005/0186933 A1 | * | 8/2005 | Trans ......................... 455/296 |

FOREIGN PATENT DOCUMENTS

EP         0310055 A1 * 5/1989

* cited by examiner

*Primary Examiner*—John Pezzlo
(74) *Attorney, Agent, or Firm*—McDonnell Boehnen Hulbert & Berghoff LLP

(57) ABSTRACT

A method and system receives a far-end signal and determines whether the far-end signal is representative of a modulated signal. The method and system also receives a near-end signal and determines whether the near-end signal is representative of a modulated signal. Predetermined characteristics of the near and far-end signals are determined as is whether the echo canceller will converge for the far-end signal. The operation of the echo canceller is controlled in response to the determination of the predetermined conditions and in response the determination of whether the far-end and near-end signals are modulated signals.

9 Claims, 7 Drawing Sheets

ECHO CANCELLER DISABLER FOR MODULATED DATA SIGNALS

FIELD OF THE INVENTION

The present invention relates to echo cancellers. More specifically, it relates to echo cancellers that are able to distinguish speech signals from other types of communication signals and echo cancellers that are enabled based upon the type of communication signal received from an outside source.

BACKGROUND OF THE INVENTION

In telecommunication networks, a subscriber device is connected to other subscriber devices using various connection techniques. For example, over short distances, two-wire lines may be employed. For longer distances, four-wire lines may be used. In addition, hybrid circuits are used to connect two-wire lines to four-wire lines.

Voice messages are transmitted through the network. For instance, if the subscriber device is a telephone, a voice message may be transmitted from a telephone, over a two-wire line to a first hybrid circuit, and then over a four-wire line to a second hybrid circuit. The second hybrid circuit may be connected to a second subscriber device.

In addition to voice messages, telecommunication networks also transmit data signals. Many of the data signals are narrow-band. For example, narrow-band data signals generated by V.21 modems are transmitted over telecommunication networks. Although some data signals can not be classified as narrow-band signals, these signals are modulated, and, therefore, their energy centers around a carrier frequency.

One consequence of using hybrid circuits to couple different types of connections together is the creation of echoes. That is, speech may be reflected by a hybrid circuit back to the speaker, causing the speaker to hear their own voice. Echo cancellers are used to minimize or eliminate the effects of these echoes.

Echo cancellers may use adaptive filters. An adaptive filter, using a filtering algorithm, produces a mathematical model of echo characteristics, which is used to generate an echo estimate. For example, if a first subscriber device sends a signal to a second subscriber device, an echo may be created. A return signal is formed, which comprises a signal sent from the second device together with the echo. When echo cancellation is performed, the echo canceller subtracts the echo estimate (created by the adaptive filter) from the return signal. Thus, the signal received by the first device should be echo-free or substantially echo-free.

However, the filtering algorithms used in adaptive filters have inherent limitations. For example, an adaptive filter, which uses the least mean square (LMS) algorithm in the adaptive filter, may diverge for narrow-band data signals. Specifically, although the echo may be cancelled, the adaptive filter will not converge the true echo path. In fact, the echo canceller will diverge to a filter related to the narrow-band frequency.

In other situations, the adaptive filter will change with the change of carrier frequency and re-converge to a different adaptive filter. The new adaptive filter will not converge to the true echo path. As a result, the echo canceller will generate an image echo when the carrier frequency changes.

For example, in the call establishment phase for a fax transmission, data is transmitted in the form of a tone with a frequency of approximately 2100 Hz and a duration of 2.6 to 4 seconds. Then, additional data is transmitted that is a modulated signal with a carrier frequency of 1750 Hz. The echo canceller, in this case, generates an image echo caused by the previously converged adaptive filter. The amplitude of the image echo depends upon the frequencies, tone amplitudes, and the adaptation constant. The image echo may be a higher value than the true echo. As a result, there may be bit errors introduced in the data.

In still other situations, the echo canceller may introduce errors in data signals. When both far-end and near-end inputs are narrow-band signals, for example, in a double-talk situation or during full duplex transmission, the adaptive filter will converge to a filter related to the two carrier frequencies.

For example, when a V.21 modem is used in full duplex mode, the caller may use a frequency of 1080 Hz and the called station may use a carrier frequency of 1750 Hz. Double-talk will occur since the caller and called station transmit at the same time. In this situation, the echo canceller will cancel some portions of the data signal since the adaptive filter converges to a filter related to the carrier frequencies. Since the near-end signals may be cancelled to some extent, the echo canceller may think that it is not in a double-talk situation. The call may be either dropped or bit errors produced as a result of the processing.

SUMMARY OF THE INVENTION

The invention provides a method and system for echo cancellation. The system and method determine whether far and near-end signals are predetermined types of signals, such as modulated signals used to transmit data. The invention then ascertains further information concerning the near and far-end signals and determines whether to freeze the adaptation of the echo canceller or bypass the echo canceller based upon this information.

In one embodiment of the present invention, a far-end input signal is transmitted to a first filtering block. The far-end input signal produces an echo. A transmission from a second user device combines with the echo to form a near-end signal. The near-end signal is transmitted to a second filtering block.

The frequency responses of the near-end signal, far-end signal, and the outputs of the filters are calculated. Powers of the responses of the filtering blocks are estimated for each filtering block. The powers are compared to predetermined thresholds. Depending upon the results of the comparison, it is determined whether the near and far-end signals are predetermined types of signals, such as data signals.

A determination is also made as to whether the algorithm used by the adaptive filter in the echo canceller converges for specific types of signals, such as data signals. Convergence is said to occur if the echo return loss enhancement (ERLE) exceeds a threshold. During the transmission of the near-end and far-end signals, if the adaptive filter converges to the true echo path, then adaptation of the adaptive filter is frozen. If the adaptive filter to a filter related to carrier frequencies converges, then the echo canceller is deactivated.

In another embodiment of the present invention, the least mean square algorithm is used in the adaptive filter. Other examples of algorithms for use in the adaptive filter are possible.

In another embodiment of the present invention, the echo canceller is used in or between hybrid circuits.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1A:
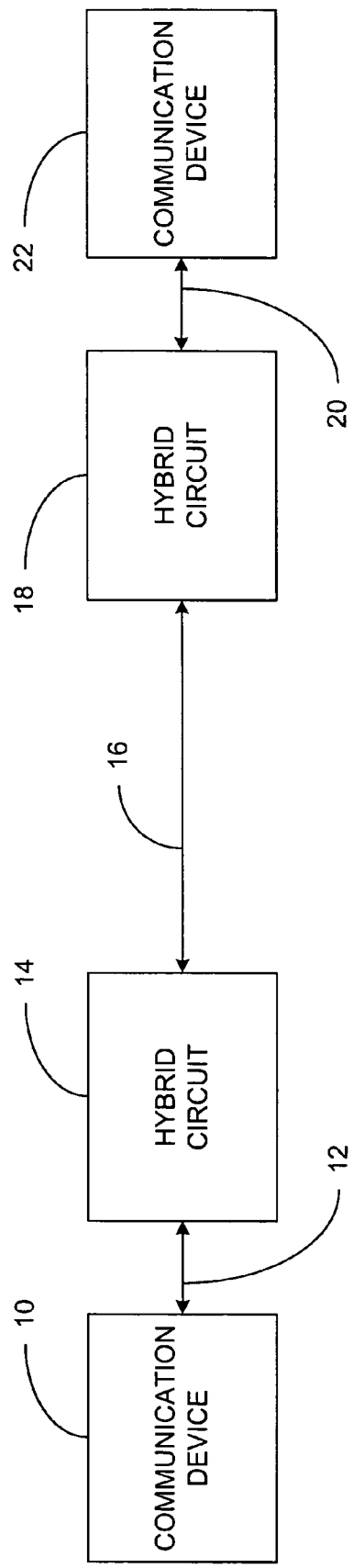
FIG. 1a is a block diagram of a communications system according to principles of the present invention.

Referring now to FIG. 1a, a communication device 10 is coupled to a hybrid circuit 14 via a first link 12. The hybrid circuit 14 is coupled to a second hybrid circuit 18 via a second link 16. The hybrid circuit 18 is coupled to a second communications device 22 via a third link 20.

The links 12 and 20 can be two-wire lines, which are also known as local subscriber loops. Two-wire lines are often used to make "local" connections (i.e., connections over short distances). The link 16 is a four-wire line, which is used for making long-distance connections.

The hybrid circuits 14 and 18 interface the two-wire line to the four wire line segments. The hybrid circuits 14 and 18 may comprise an echo canceller, which eliminates or reduces the effects of echoes present in the system. The hybrid circuits 14 and 18 may be hardware, software or any combination of hardware and software.

The communication devices 10 and 22 are any type of communication device capable of transmitting voice and/or data information. For example, the communication devices 10 and 22 may be a fax machine, a telephone, or a modem.

The communication device 10 transmits a communication signal through the hybrid circuit 14 to the hybrid circuit 18 via the communication links 12 and 16. The signal is then sent on to the communication device 22 via the communication link 20. In response, the communication device 22 sends a return transmission. For example, if the communication devices 10 and 22 are telephones, the user using the communication device 10 transmits a message to the user using communication device 22. The user using the communication device 22 responds to the message received from the user of the communication device 10 by transmitting a return message.

The signal from the communication device 10 is transmitted to the hybrid circuit 18 and creates an echo, which is added on to the return signal transmitted from the communication device 22. Similarly, the signal from the communication device 22 is transmitted to the hybrid circuit 14 and creates an echo, which is added on to the return signal transmitted from the communication device 10.

The hybrid circuits 14 and 18 also include echo cancellers, which negate or eliminate the effects of echoes. The echo cancellers comprise adaptation filters. The adaptation filters may have their adaptation frozen, under certain conditions. In addition, the echo cancellers may be deactivated under certain conditions.

Figure 1B:
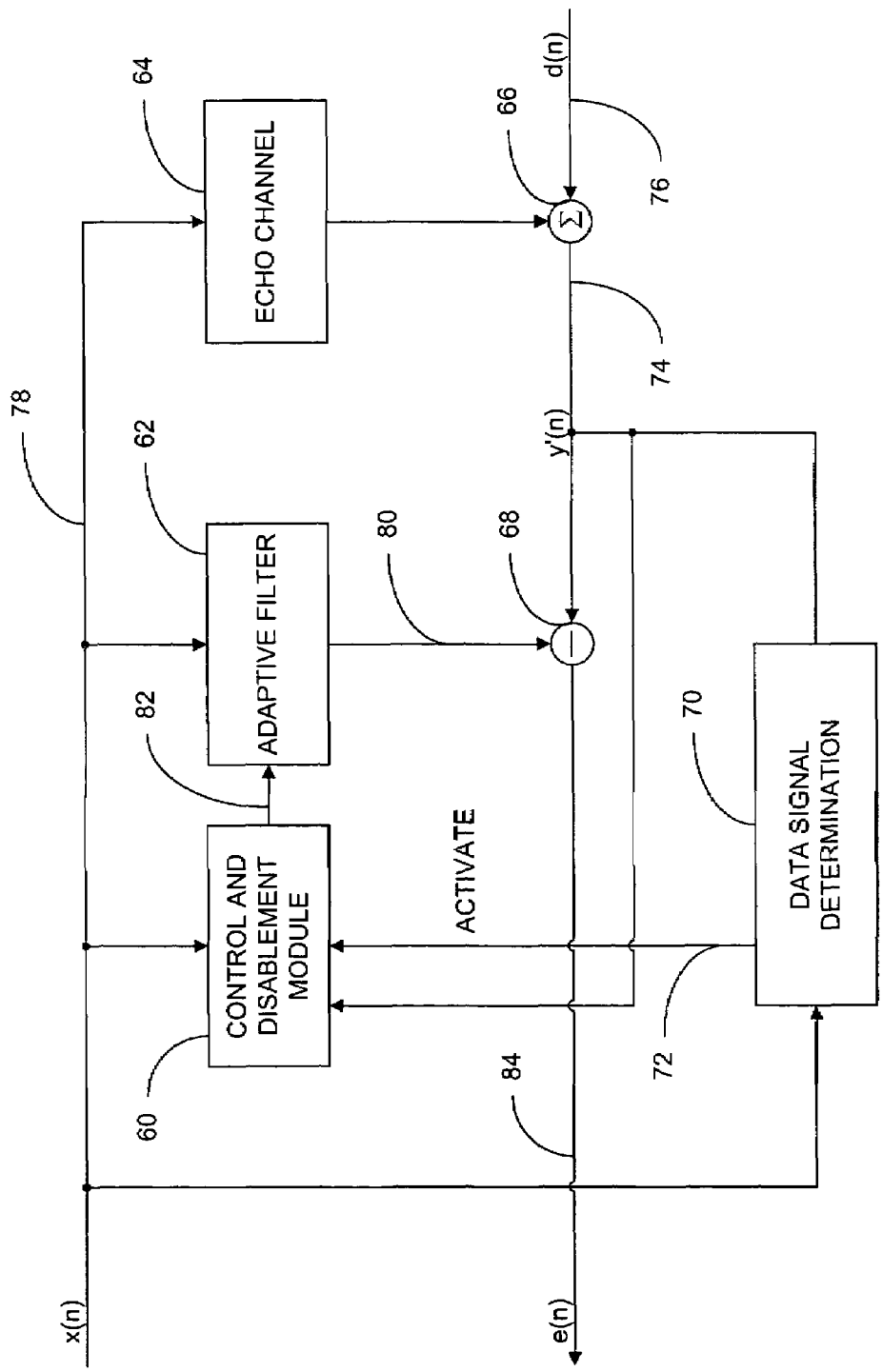
FIG. 1b is a block diagram of a echo cancellation system according to principles of the present invention.

Referring now to FIG. 1b, a signal over lead 78, x(n), is transmitted to a control and disablement module 60, and an adaptive filter 62. The signal forms an echo channel 64. The echo channel 64 and a signal 76, d(n), are coupled to a summing junction 66 The output of the summing junction 66 is near-end signal 74, y'(n). The near-end signal 74 is coupled to a subtracter 68, a data signal determination module 70, and the control and disablement module 60. The data signal determination module 70 is coupled to the control and disablement module 60 via a lead 72. The adaptive filter output, over a lead 80, is coupled to the subtracter 68. The output of the subtracter 68, e(n), is returned to the far-end user.

The far-end signal x(n) is received by the adaptive filter and creates an echo channel 64. The function of the adaptive filter 62 is to model the characteristics of the echo and produce an estimate of the echo created in the echo channel 64. The output of the adaptive filter 80 contains the estimate of the echo in the echo channel 64.

A near-end user transmits speech or data over a lead 76. The echo from the echo channel 64 combines with the speech over a lead 76 at the summing junction 66 to form a near-end signal, y'(n), over the lead 74.

The data signal determination module 70 receives the near-end signal y'(n) over the lead 74 and the far-end signal x(n) over the lead 78. The data signal determination module 70 determines whether the x(n) and y'(n) signals are data signals, using one of a variety of methods. For example, the data signal determination module 70 may use filters to which the signals x(n) to and y'(n) are applied. The output of the filters are represented by two equations and have the same frequency response. The coefficients (powers) of the terms that comprise the two equations can be estimated. The relative values of the terms are compared to each other and against predetermined thresholds. The results of the comparisons determine whether the signals x(n) and y'(n) are determined to be data signals.

If either of the signals are determined to be data signals, an indication is sent from the data signal determination module 70 to the control and disablement module 60 over the lead 72. The effect of asserting the lead 72 is to activate the control and disablement module 60. The control and disablement module 60 determines whether the adaptation of the adaptive filter 62 should be frozen or whether the adaptive filter 62 should be bypassed. If the adaptive filter 62 is frozen, then the filter 62 still produces an echo estimate. If the adaptive filter 62 is bypassed, its connection with the lead 78 is broken, and it does not have any effect in the system.

Figure 1C:
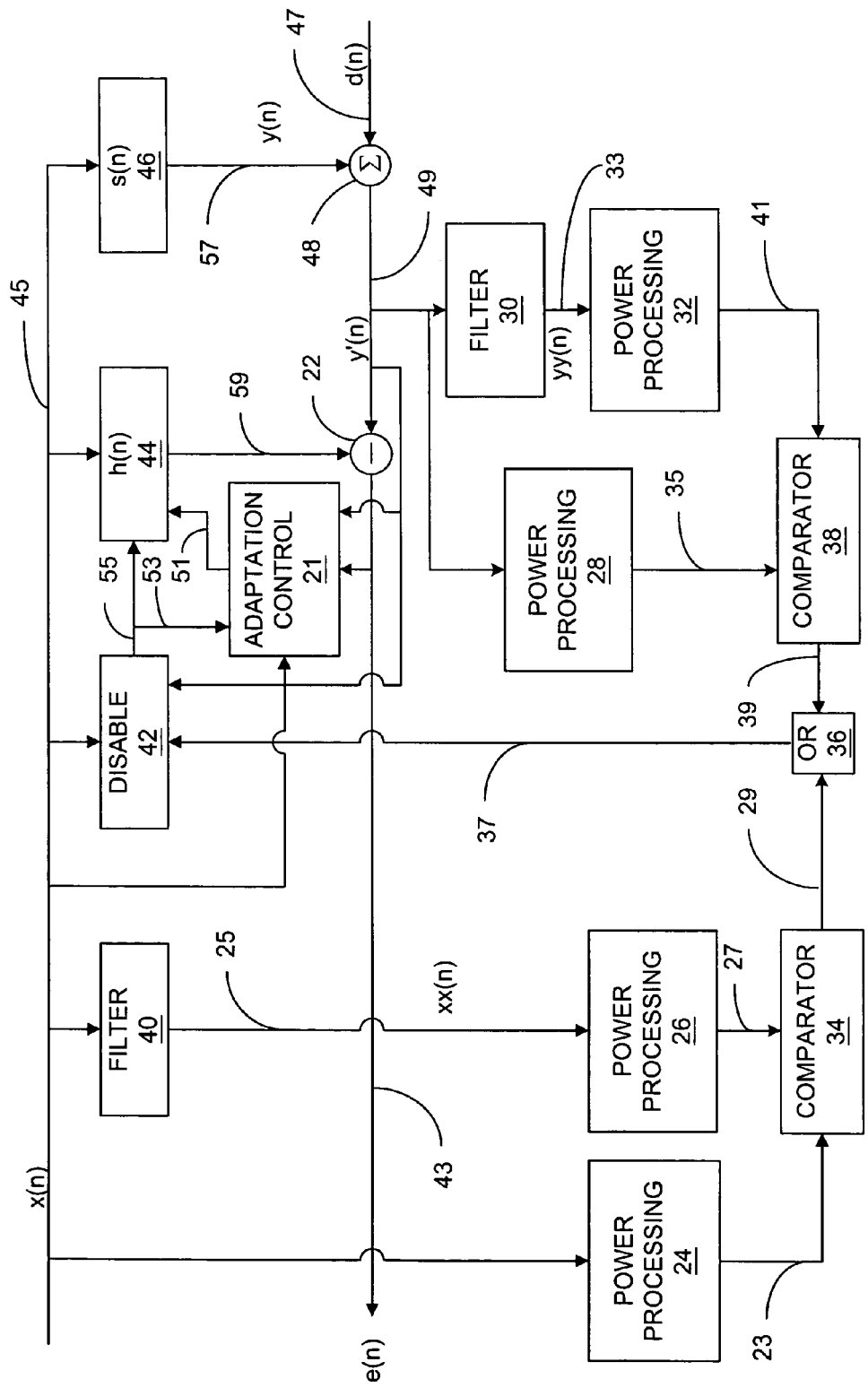
FIG. 1c is a block diagram of an echo cancellation system according to principles of the present invention.

Referring now to FIG. 1c, a far-end input x(n) over a lead 45 is coupled to a filter 40, and an adaptive filter 44. The adaptive filter 44 has an impulse response represent by h(n). The far-end input x(n), over the lead 45, also is connected and echo path 46 having characteristics s(n).

The echo path 46 produces the an echo, y(n), over a lead 57. The lead 57 is coupled to a summing junction 48. A local signal d(n), which can be either voice or data, is also coupled, via the lead 47, to the summing junction 48. The summing junction 48 combines d(n) and y(n) to form a near-end input, y'(n), over the lead 49.

The far-end input x(n), over the lead 45, is coupled to a first power processing module 24 and the filter 40. The filter 40 outputs a signal xx(n) over a lead 25, which is coupled to a second power processing module 26. The near-end input y'(n) over the lead 49 is coupled to a filter 30 and a third power processing module 28. A processing module 24 is coupled to a comparator 34 via lead 23. The comparator 34 is also computed to power processing moduler 26 via lead 27. The comparator 34 compares the results over leads 27 and 23. Based upon the results of the comparison, it is decided by the comparator 34 whether the far-end signal is a data signal. The comparator 34 is coupled to an OR gate 36.

The filter 30 is coupled to a fourth power processing module 32 via a lead 33, which carries a signal yy(n). The output of the processing module 32 is coupled to a comparator 38 via lead 41. The comparator 38 compares the results over leads 35 and 41. Based upon the results of the comparison, it is decided by the comparator 38 whether the near-end signal is a data signal. The comparator 38 is coupled to the third processing module 28. The comparator 38 is also coupled to an OR gate 36.

The output of the adaptive filter 44, via a lead 59, is coupled with near-end input, y'(n), via lead 49, to a summing junction 22 and produces an output e(n), via a lead 43. The output of the OR gate 36 is coupled to a disable module 42. The disable module 42 is coupled to the adaptive filter 44 via a lead 55. The lead 55 communicates information indicating whether the adaptive filter 44 should be frozen or bypassed.

The disable module 42 determines the action to take relative to the adaptive filter 44. The adaptive filter 44 may be bypassed (deactivated) or the adaptive filter 44 may have its adaptation frozen. Alternatively, the adaptive filter 44 may continue to operate. The disable module 42 determines which of these actions to take. Based upon the comparison of x(n) and y'(n) received over leads 45 and 49 respectively, it can be determined whether both of these signals are carrier signals. Depending upon both of these determinations, then the disable module 42 determines whether the proper action to take is to freeze adaptation or to bypass the adaptation filter or to do nothing. The disable module 42 is activated by the lead 37, which indicates whether either the far-end or the near-end signals are data signals. If neither of the near-end or far-end signals are data signals, then no action relative to the adaptation filter 44 need be taken.

The far-end input signal x(n) is transmitted from a far end user. The signal can be transmitted over a four-wire segment. The signal x(n) creates the echo channel 46 to produce an echo signal y(n). The echo signal y(n) mixes with the near-end audio signal d(n) and forms the near-end input. The signal d(n) represents a signal (speech or data) from a local user.

Both filtering blocks have the same frequency response. If g(n) represents the detection filter, then $$xx(n) = \sum_{k=-\infty}^{n} g(k)x(n-k) \text{ and} \quad (1)$$

$$yy(n) = \sum_{k=-\infty}^{n} g(k)y'(n-k) \quad (2)$$

The powers $P_x$ of x(n), $P_{xx}$ of xx(n), $P_y$, of y'(n), and $P_{yy}$ of yy(n) are computed using an estimation method. One way to estimate powers is by using the equation $$P(n+1) = \alpha P(n) + (1-\alpha)d(n)^2 \quad (3)$$

In the equation (3), $0 < \alpha < 1$ and is a constant, and d(n) can be x(n), xx(n), y'(n), and yy(n). Other methods to estimate powers are possible.

The filters 30 and 40 used in the filtering blocks are high-pass or band-pass filters that have predetermined frequency responses. Preferably, the gain is less than 0 dB when the frequency is below FT HZ, 0 dB at FT HZ, and greater than 0 dB when the frequency is above FT HZ. Typically $F_T$=750 Hz since the carrier frequency is usually larger than 750 Hz. The major component of speech signals is in the frequency range between 200 Hz and 600 Hz. On the other hand, the data carrier frequencies are above 750 Hz for the most call devices and above 1500 Hz for all called stations. The power level of original speech signals is always greater than the power level after the high-pass filtering to the speech signals. The power level of a data signal with higher peaks at above $F_T$ Hz, in the contrast, is always less than the power level after the high pass filtering to the data signal. If a particular carrier frequency is desired, then $F_T$ can be chosen to be a value<$F_T$ by a threshold.

$$x(n) = Ae^{j2\pi \frac{f_1}{f_s} n} \quad (4)$$

is the far-end input, and $f_1$ is the carrier frequency, $f_s$, is the sampling frequency, and A is the amplitude, then the echo is represented by $$y(n) = \sum_{k=0}^{L-1} s*(k)x(n-k) \quad (5)$$

Where s(n) is the echo path with length L. According to equation (4), $$y(n) = A\sum_{k=0}^{LL-1} s*(k)e^{2\pi \frac{f_1}{f_s}(n-k)} \quad (6)$$

If the adaptive filter is h(n,k) for k=0,1, ..., L−1, then the residual is defined as $$e(n) = y(n) - \sum_{k=0}^{L-1} h*(n,k)x(n-k) \quad (7)$$

The echo canceller (See FIG. 1) should not only make e(n) go to zero with time, but also make the adaptive filter converge to the echo path.

However, the adaptive filter does not converge to the true echo path although e(n) goes to zero with time. According to LMS adaptive filtering algorithm, the updating of adaptive filter is based on $$h(n+1,i) = h(n,i) + \mu e*(n)x(n-i) \quad (8)$$

for i=0, 1, ..., L−1. Substituting equation (8) into equation (7) gives:

$$h(n+1, i) = h(n, i) + \mu y*(n)x(n-i) - \mu \sum_{k=0}^{L-1} h*(n, k)x(n-k)x(n-i) = \quad (9)$$

$$h(n, i) - \mu A^2 \sum_{k=0}^{L-1} h(n, k)e^{j2\pi \frac{f_1}{f_s}(k-i)} + \mu A^2 \sum_{k=0}^{L-1} s(k)e^{2\pi \frac{f_1}{f_s}(k-i)}$$

If $$h'(n, i) = h(n, i)e^{j2\pi \frac{f_1}{f_s}i} \quad (10)$$

and $$B = \sum_{k=0}^{L-1} s*(k)e^{j2\pi \frac{f_1}{f_s}k} \quad (11)$$

Then, equation (9) becomes $$h'(n+1, i) = h'(n, i) - \mu A^2 \sum_{k=0}^{L-1} h'(n, k) + \mu A^2 B \text{ That is,} \quad (12)$$

$$h'(n+1, i) - (1-\mu A^2)h'(n, i) + \mu A^2 \sum_{\substack{k=0 \\ K \neq I}}^{L-1} h'(n, k) = \mu A^2 B \quad (13)$$

B is not related to index n and i. From equation (13), the individual taps in the echo path do not affect the updating of the adaptive filter taps. The adaptive filter, therefore, will not converge to the true echo path. This can be seen from the solution to equation (13). Let the z-transform of h'(n,i) be hh(z,i), and take the z-transform to both sides of equation (13):

$$[z-(1-\mu A^2)]hh(z, i) + \mu A^2 \sum_{\substack{k=0 \\ K \neq I}}^{L-1} hh(z, k) = \mu A^2 \frac{z}{1-z} B \quad (14)$$

After some computation $$hh(n, i) = \frac{B}{L}\left(\frac{1}{1-z^{-1}} - \frac{1}{1-(1-L\mu A^2)z^{-1}}\right) \quad (15)$$

Taking the inverse z-transform to both sides of equation (15) and using equation (10), produces $$h(n, i) = \frac{B}{L}[1-(1-L\mu A^2)^n]e^{-j2\pi \frac{f_1}{f_s}i} \quad (16)$$

Equation (28) shows that when $|1-L\mu A^2|<1$, the adaptive filter converges to a filter that is a function of the frequency $f_1$. That is, $$h(\infty, i) = \frac{B}{L}e^{-j2\pi \frac{f_1}{f_s}i} \quad (17)$$

According to equation (7), the residual echo goes to zero although the adaptive filter is completely different from the true echo path.

If the far-end is carrier signal and the near-end is another carrier, and the echo canceller based on LMS adaptive filtering algorithm, the adaptive filter will converge to a filter of function of the difference of the carrier frequencies. In this case, the near carrier will be cancelled significantly. If $$x(n) = Ae^{-j2\pi \frac{f_1}{f_s}n} \quad (18)$$

is the far-end input, where $f_1$ is the carrier frequency, $f_s$ is the sampling frequency, and A is the amplitude, $$y(n) = Ae^{-j2\pi \frac{f_2}{f_s}n} \quad (19)$$

is the near-end input with carrier frequency $f_2$, and the adaptive filter be h(n, k) for k=0, 1, ..., L−1, then according to the LMS adaptive filtering algorithm, the residual is defined as $$e(n) = y(n) - \sum_{k=0}^{L-1} h*(n, k)x(n-k) \quad (20)$$

and the updating of adaptive filter is based on $$h(n+1,i)=h(n,i)+\mu e*(n)x(n-i) \quad (21)$$

for i=0, 1, ..., L−1. Substituting equations (18), (19) and (20) into equation (21):

$$h(n+1, i) = h(n, i) + \mu y*(n)x(n-i) - \mu \sum_{k=0}^{L-1} h(n, k)x*(n-k)x(n-i) \quad (22)$$

$$= h(n, i) + \mu A^2 \sum_{k=0}^{L-1} h(n, k)e^{j2\pi \frac{f_1}{f_s}(k-i)} + \mu A^2 e^{-j2\pi \frac{f_1-f_2}{f_s}n}e^{-j2\pi \frac{f_1}{f_s}i} \quad (23)$$

If $$h'(n, i) = h(n, i)e^{j2\pi \frac{f_1}{f_s}i} \quad (24)$$

Then, equation (9) becomes $$h'(n+1, i) = h'(n, i) - \mu A^2 \sum_{k=0}^{L-1} h'(n, k) + \mu A^2 e^{-j2\pi \frac{f_1-f_2}{f_s}n} \text{ Or} \quad (25)$$

-continued $$h'(n+1, i) - (1 - \mu A^2)h'(n, i) + \mu A^2 \sum_{\substack{k=0 \\ k \neq i}}^{L-1} h'(n, k) = \mu A^2 e^{-j2\pi \frac{f_1-f_2}{f_s} n}$$

and the z-transform of h' (n,i) is hh(z,i), and take the z-transform to both sides of equation(25), gives:

$$[z - (1 - \mu A^2)]hh(z, i) + \mu A^2 \sum_{\substack{k=0 \\ k \neq i}}^{L-1} hh(z, k) = \mu A^2 \frac{z}{z - \exp\left(j2\pi \frac{f_1 - f_2}{f_s}\right)} \quad (26)$$

$$hh(z, i) = \frac{\mu A^2}{1 - L\mu A^2 - \exp\left(j2\pi \frac{f_1 - f_2}{f_s}\right)} \quad (27)$$

$$\left(\frac{1}{1 - (1 - L\mu A^2)z^{-1}} - \frac{1}{1 - \exp\left(j2\pi \frac{f_1 - f_2}{f_s}\right)z^{-1}}\right)$$

Taking the inverse z-transform to both sides of (27) and using (24), gives $$h(n, i) = \frac{\mu A^2}{1 - L\mu A^2 - \exp\left(j2\pi \frac{f_1 - f_2}{f_s}\right)} \quad (28)$$

$$\left((1 - L\mu A^2)^n - \exp\left(j2\pi \frac{f_1 - f_2}{f_s} n\right)\right) e^{-j2\pi \frac{f_1}{f_s} i}$$

From equation (28), when |1−L $\mu A^2$|1, the adaptive filter converges to a filter that is a function of the frequency difference $f_1-f_s$ in all taps and a function of the frequency $f_1$ in each tap, this is, $$h(n, i) = \frac{\mu A^2}{1 - L\mu A^2 - \exp\left(j2\pi \frac{f_1 - f_2}{f_s}\right)} \exp\left(j2\pi \frac{f_1 - f_2}{f_s} n\right) e^{-j2\pi \frac{f_1}{f_s} i} \quad (29)$$

The echo is added to the near-end audio signal (lead 47). The adaptive filter 44 estimates the characteristics of the echo and then subtracts these characteristics from the near-end signal to form the return signal. Therefore, a need exists to bypass the echo canceller.

The adaptation control 21 receives the near-end signal y'(n), the far-end signal x(n), and the return signal e(n). These signals are used to determine when the adaptive filter h(n) 144 should be updated. The adaptation size step can be altered to control how quickly the adaptive filter 144 converges.

A determination is made as to whether the far-end signal and near end signals are predetermined types of signals, such as data signals. The filters have outputs that can be represented by equations. The determination uses the processing modules 24 and 26, which determine the powers of the equations which represent the frequency responses of the filters. The powers are compared at the comparators 34 and 38. Based upon the results of the comparison, a signal indicating whether the signal is a data signal is output over the leads 29 and 39. If either of the signals input to the OR gate 36 are affirmative, then the OR gate 36 sends a signal over lead 37 to the disable module 42.

As described above, the disable module 42 determines whether the adaptive filter 44 is to be disabled or the adaptation frozen. If adaptation is frozen, this is communicated via lead 53 to adaptation control 21. If the adaptive filter 44 is to be disabled, that information is communicated to filter 44 via lead 55. In this way the effects of echoes with data signals are removed from the system.

Figure 2:
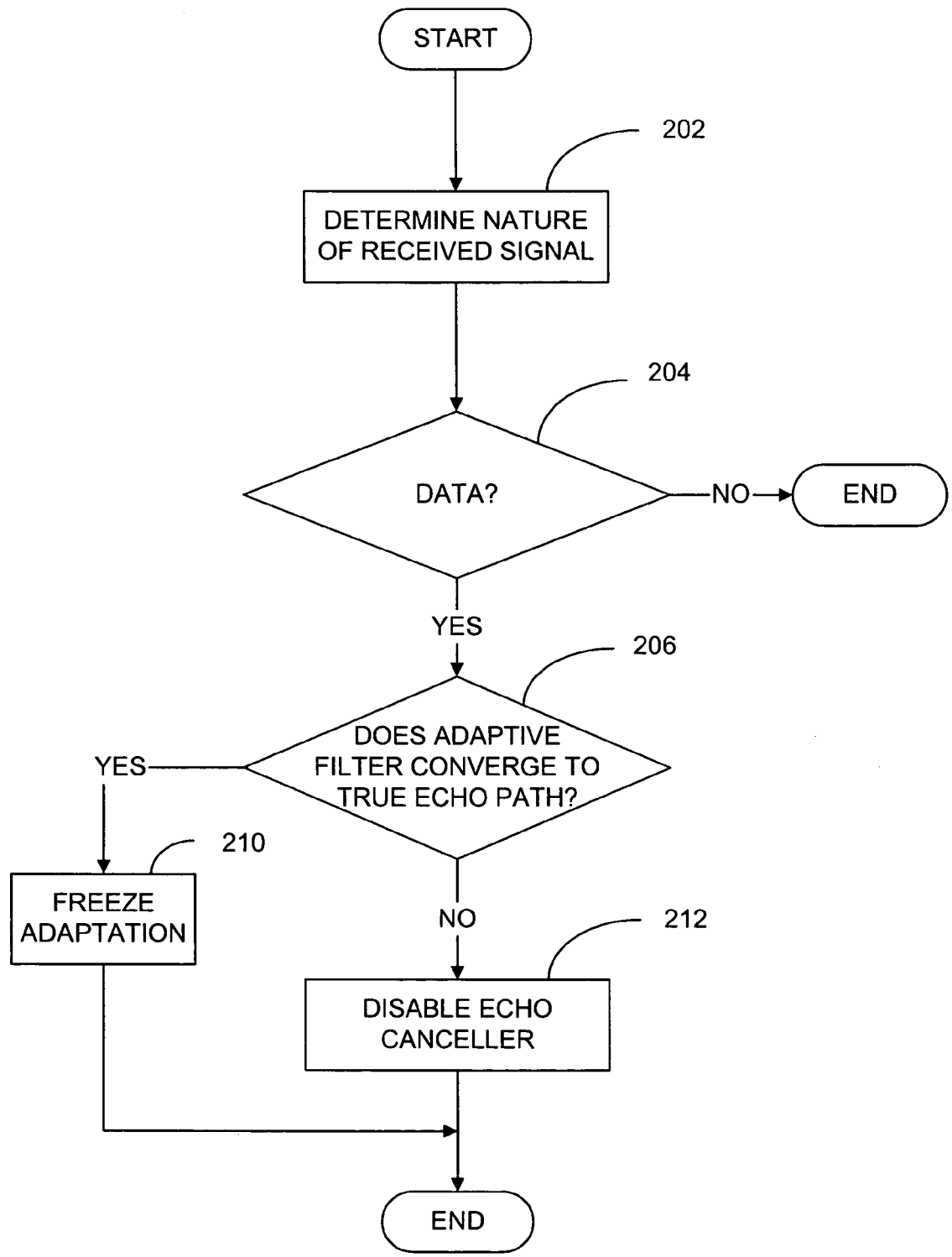
FIG. 2 is a flowchart of the operation of the echo cancellation system according to principles of the present invention.

Referring now to FIG. 2, the operation of the system is described. At step 202, the system determines the nature of the near and far-end signals. In other words, the system determines whether the signals (far-end and near-end) are of a certain type, such as, modulated data signals. At step 204, the system uses the results at step 202 to make a branching decision. For example, if data was detected at step 202, then control proceeds to step 206. If data was detected, that is, at least one of the signals represents a data signal, then at step 206, the system determines whether the adaptive filter converges. Step 206 may have already been determined earlier. For example, a training signal is supplied before data signal transmission and the adaptive filter converges to the true echo path by the training. If the answer at step 206 is affirmative, then control continues at step 210 where adaptation is frozen. If the answer is negative, control continues at step 212 where the echo canceller is disabled.

Figure 3:
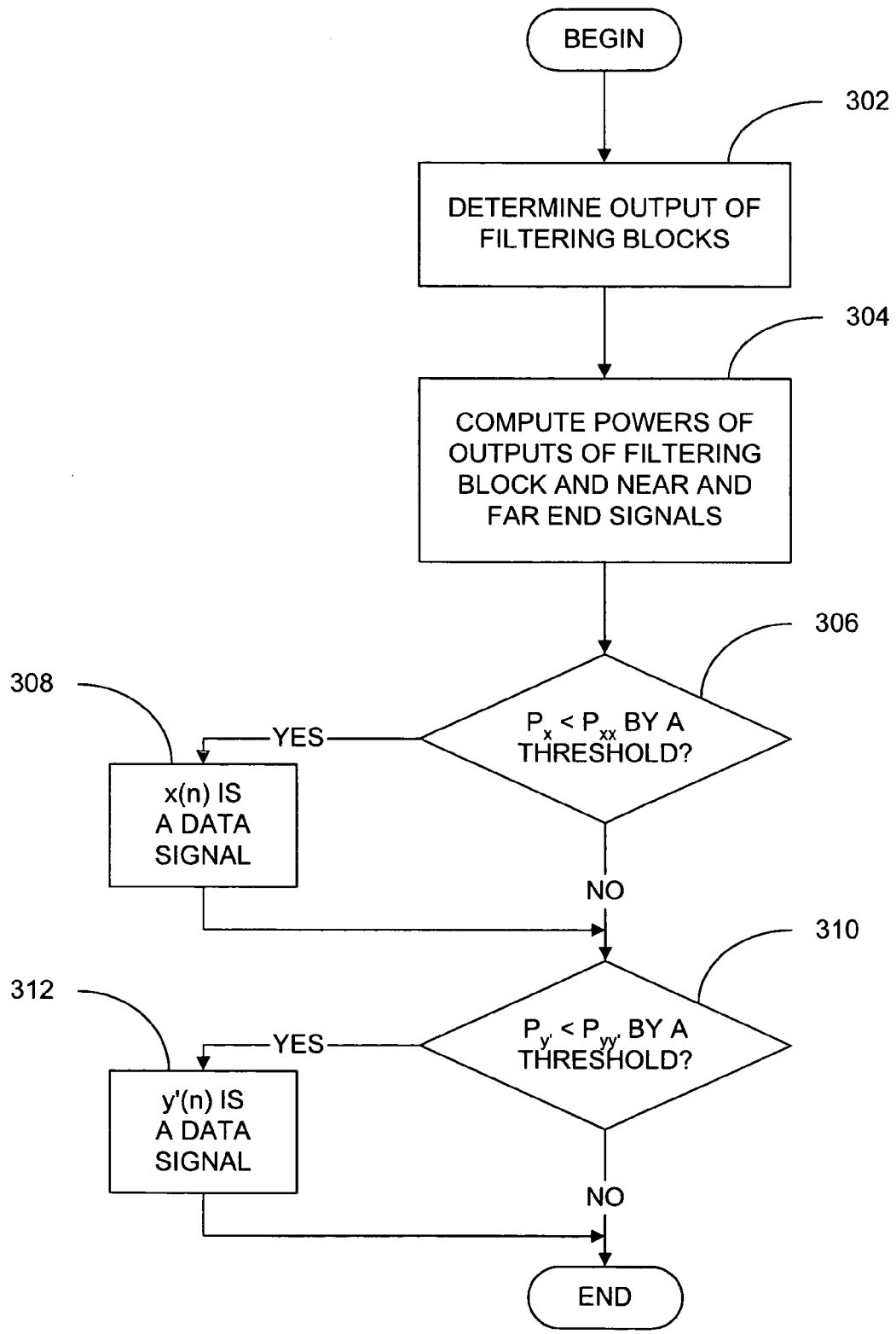
FIG. 3 is a flowchart of the operation of the disablement feature according to principles of the present invention.

Referring now to FIG. 3, a method to determine the characteristics of the near-end and the far-end signals is described. At step 302, the system determines the output of the filtering blocks. The output of the filtering blocks is used to determine the coefficients (powers) of the equations representing the frequency responses of the filters. At step 304, the powers of the equations representing the frequency responses of the filters are determined. This is done for both the near-end signals and the far-end signals. The powers include the powers of x(n), (Px); the powers of xx(n), Pxx; the powers of y'(n), Py'; and the powers of yy'(n), Pyy'. The powers can be estimated using any number of methods.

At step 306, the system determines whether Px is less than Pxx by a threshold value. For example, the threshold may be set to equation 32. If the answers at step 306 is negative, then control continues at step 310. If the answer at step 306 is affirmative, then control continues at step 308. At step 308, the system sets some type of indicator that the far-end signal is a data signal, and this is used by the system to take appropriate action regarding the adaptive filter. Control then continues at step 310.

At step 310, the system determines whether Py' is less than Pyy' by a threshold value. For example, the threshold may be set to equation 32. If the answer at step 310 is negative, then control ends. If the answer at step 310 is affirmative, then control continues at step 312 where the system sets an indicator that signifies that the near-end signal is a data signal. Control then ends.

Figure 4:
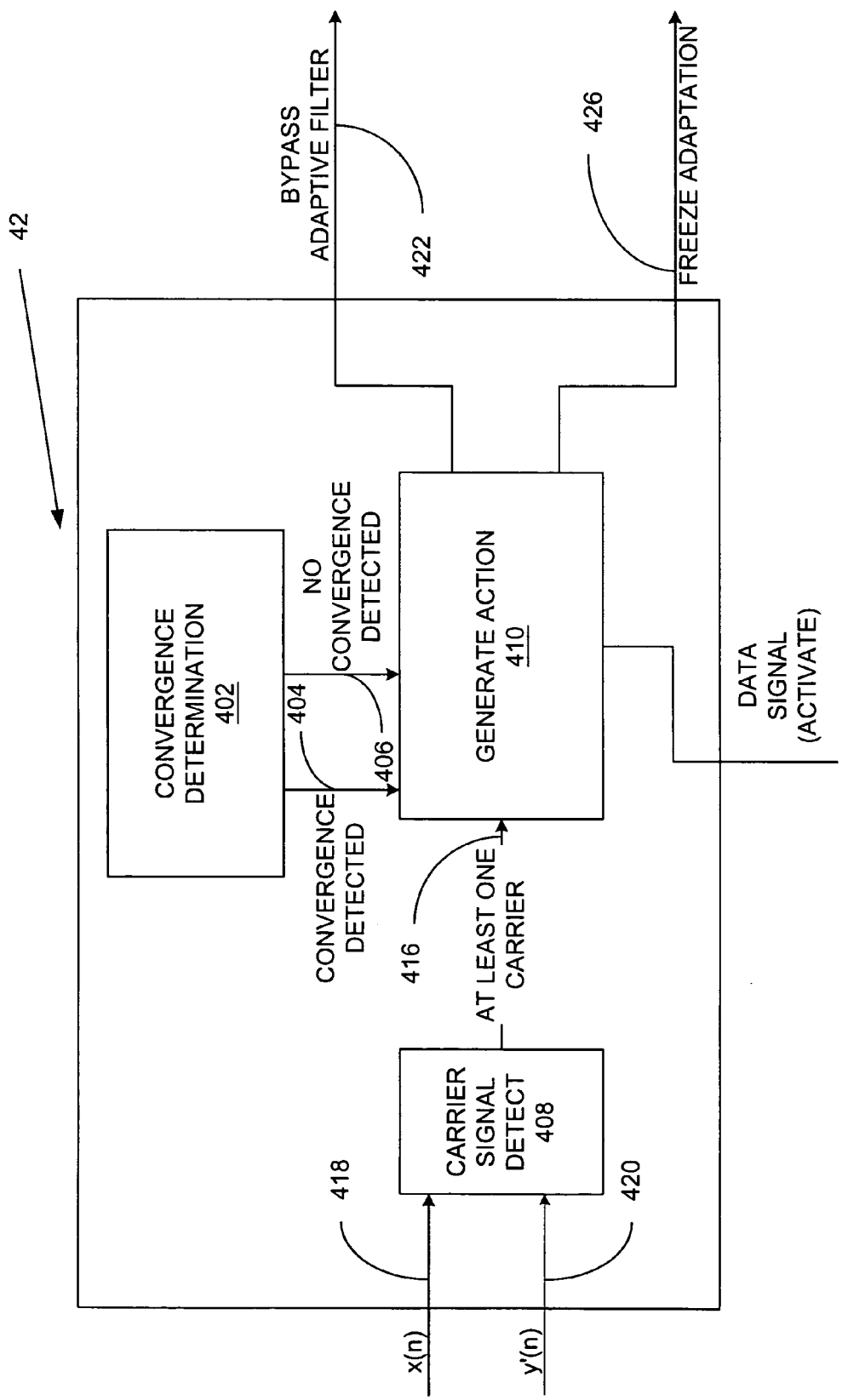
FIG. 4 is a block diagram of the disablement module according to principles of the present invention.

Referring now to FIG. 4, a module, which controls an adaptive filter, is described. A carrier signal detect module 408 is coupled to a generate action module 410. The generate action module 410 is coupled to a convergence determination module 402.

A data signal indicator 416 is coupled to the generated action module 410. When the data signal indicator is asserted, the generate action module 410 is activated. The carrier signal detect signal receives the far-end input x(n), over a lead 418 and the near-end input y'(n), over the lead 420. The carrier signal detect module 408 determines if at least one input is a carrier (data) signal. The convergence determination module 402 determines whether the adaptive filter will diverge for data signals. Convergence is determined if Echo Return Loss Enhancement is greater than a threshold. Typically, the threshold is 16 db. A determination is then made if there are significant coefficients in the adaptive filter that focus on the beginning of the adaptive filter and follow the pattern described by equations (17) and (29). If the answer is affirmative, convergence exists. If the answer is negative, convergence does not exit. In any case, the convergence determination module 402 outputs a convergence detected lead 404 that indicates that convergence was detected and a no convergence detected lead 406, which indicates that no convergence was detected. The leads 404 and 406 are coupled to the generated action module 410.

The generate action module 410 receives the leads 404 and 406. It uses the information on these leads plus the information on the lead 416 to determine an action to take. The action may be either freezing the adaptation of the adaptive filter 44 or it may be bypassing the adaptive filter. If the adaptive filter is bypassed, then the adaptive filter is no longer connected to the far-end input and it does not generate an estimate of the echo in the echo channel. The generate action module 410 generates a bypass adaptive filter lead 422, which indicates that the adaptive filter is to be bypassed, and a freeze adaptation lead 426, which indicates that the adaptation of the adaptive filter is to be frozen. If neither of the leads 422 and 426 is asserted, then neither of the actions will be taken.

Figure 5:
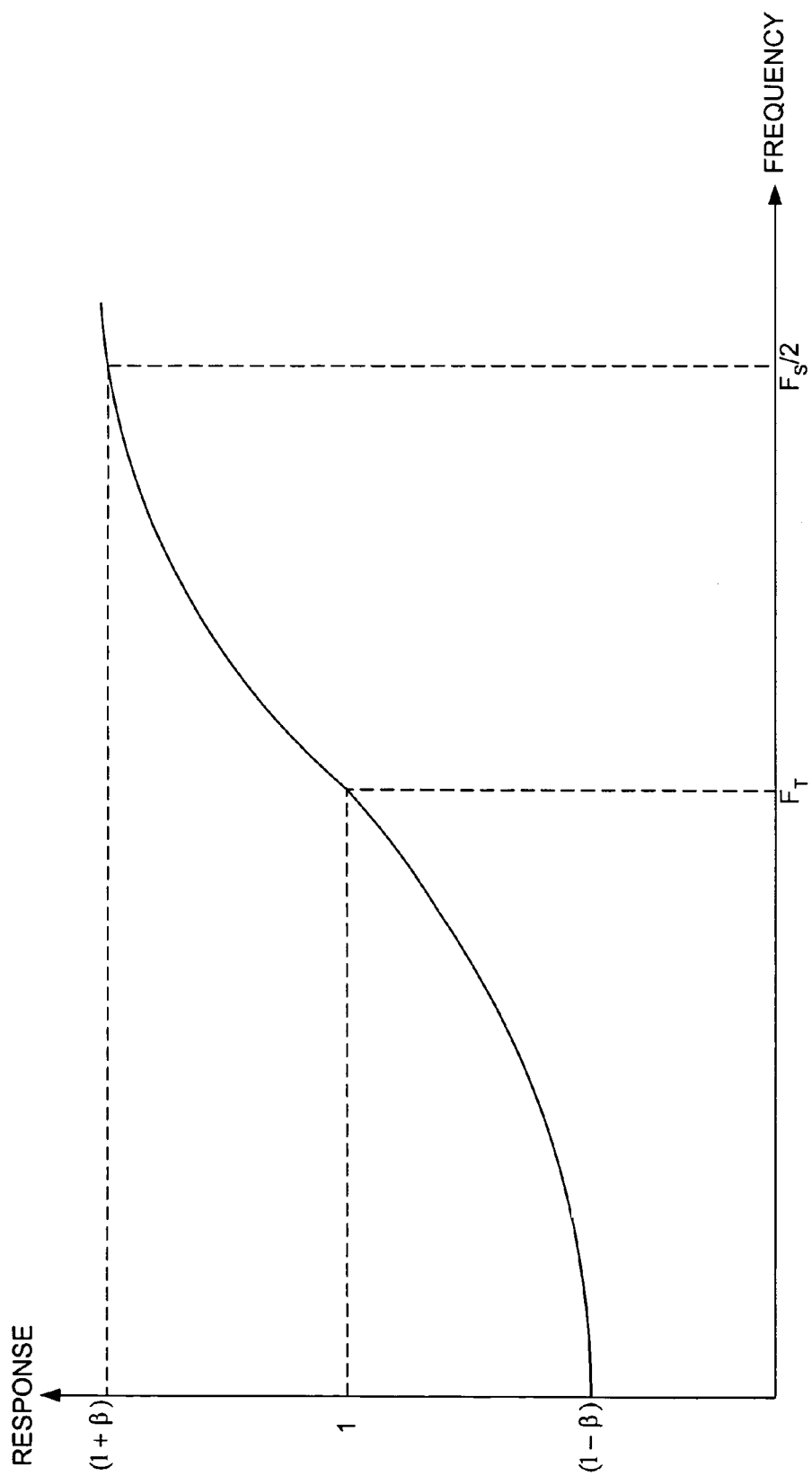
FIG. 5 is a graph of the frequency response according to principles of the present invention.

Referring now to FIG. 5, the frequency response of the filters is described. The high pass filter g(n) is of any type with the z-transform of:

$$g(z) = 1 - \beta z^{-1} \quad (30)$$

The frequency response is started at $(1-\beta)$ and is monotonically increased to $(1+\beta)$ at the maximum frequency $(F_S/2$, where $F_s$ is the sampling frequency, typically 8000 Hz). The frequency response is 1 at $F_T$. $\beta$ is determined by $|1 - \beta e^{-j2\pi F_T/F_s}| = 1$, where $j = \sqrt{-1}$. The relationship between $\beta$ and $F_T$ is $$= 2 \cos(2\pi F_T/F_s) \quad (31)$$

For example, suppose that $F_T = 750$ Hz and $F_S = 8000$ Hz, then $\beta = 1.6629$. Note that this filter with $\beta = 1.6629$ cannot be used as the pre-emphasis filter in a pair of pre-emphasis and post-emphasis filters although it looks like a pre-emphasis filter. This is because the post-emphasis is not stable due to its pole greater than 1.

If it desired to detect whether there is a carrier frequency greater than or equal to $f_1$, then the threshold should be less than $$T = 1 + \beta^2 - 2\beta \cos\left(\frac{2\pi f_1}{f_s}\right) \quad (32)$$

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

The invention claimed is:

1. An echo canceller comprising:
    means for receiving a near-end signal and means for receiving a far-end signal, whereby said near-end signal includes an echo of said far-end signal;
    determination means, coupled to said near and far-end signals, for determining characteristics of said near-end and far-end signals;
    an adaptive filter, coupled to said far-end signal, said adaptive filter using a predetermined algorithm to produce an estimate of an echo;
    subtraction means for subtracting out said estimate from said near-end signal; and
    control means, coupled to said near-end signal, said far-end signal, and said determination means, wherein said control means adjusts the operation of said adaptive filter based upon said characteristics of said near and far-end signals,
    said control means comprising
        a carrier detect module coupled to a generate action module, said generate action module coupled to a convergence determination module,
        said carrier detect module determining if at least one input is a data signal, said convergence determination module determining whether said adaptive filter diverges for said data signal, and wherein said generate action module determines whether to freeze or bypass said adaptation filter.

2. The echo canceller of claim 1 wherein said control means determines the divergence of the adaptive filter.

3. The echo canceller of claim 1 wherein said control means selectively deactivates said adaptive filter based upon said characteristics of said near and far end signals.

4. The echo canceller of claim 1 further wherein said control means selectively freezes the adaptation of said adaptive filter based upon said characteristics of said near-end and said far-end signals.

5. The echo canceller of claim 1 wherein said adaptive filter uses a least mean square (LMS) algorithm.

6. An echo canceller control module comprising:
    means for receiving a far-end signal and means for receiving a near-end signal;
    means for determining whether said near and far end signals have predetermined characteristics;
    means for receiving predetermined operating characteristics of said adaptive filter; and
    means for sending a control signal to control the operation of an echo canceller based upon said determination of whether said near and far end signals have predetermined characteristics and said operating characteristics, said means for sending said control signal comprising
a carrier detect module coupled to a generate action module, said generate action module coupled to a convergence determination module,
said carrier detect module determining if at least one input is a data signal, said convergence determination module determining whether said adaptive filter diverges for said data signal, and wherein said generate action module determines whether to freeze or bypass said adaptation filter.

7. The control circuit of claim 6 wherein said control signal indicates the adaptation of the adaptation filter should be frozen.

8. The control circuit of claim 6 wherein said control signal indicates that the operation of the adaptation filter should be suspended.

9. The control circuit of claim 6 wherein said determination means uses a high-pass filter.

* * * * *